United States Patent
Ishii et al.

(10) Patent No.: US 9,438,890 B2
(45) Date of Patent: Sep. 6, 2016

(54) IMAGE PROCESSOR, 3D IMAGE CAPTURE DEVICE, IMAGE PROCESSING METHOD, AND IMAGE PROCESSING PROGRAM

(75) Inventors: Yasunori Ishii, Osaka (JP); Masao Hiramoto, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 410 days.

(21) Appl. No.: 13/816,748

(22) PCT Filed: Jul. 4, 2012

(86) PCT No.: PCT/JP2012/004317
§ 371 (c)(1),
(2), (4) Date: Feb. 13, 2013

(87) PCT Pub. No.: WO2013/027320
PCT Pub. Date: Feb. 28, 2013

(65) Prior Publication Data
US 2015/0138319 A1 May 21, 2015

(30) Foreign Application Priority Data

Aug. 25, 2011 (JP) .................................. 2011-183909

(51) Int. Cl.
H04N 13/02 (2006.01)
H04N 13/00 (2006.01)
H04N 5/369 (2011.01)

(52) U.S. Cl.
CPC ........ *H04N 13/0257* (2013.01); *H04N 5/3696* (2013.01); *H04N 13/0025* (2013.01); *H04N 13/0037* (2013.01); *H04N 13/0214* (2013.01); *H04N 13/0217* (2013.01)

(58) Field of Classification Search
CPC ..................... H04N 13/0239; H04N 13/0055; G06T 5/001; G06T 7/0065

USPC .......... 348/42, 43, 46, 47; 382/154, 167, 285
See application file for complete search history.

(56) References Cited

U.S. PATENT DOCUMENTS 5,930,388 A * 7/1999 Murakami et al. ........... 382/167
6,415,053 B1 * 7/2002 Norimatsu .................... 382/199
(Continued)

FOREIGN PATENT DOCUMENTS

JP      02-171737 A     7/1990
JP      2002-344999 A   11/2002
(Continued)

OTHER PUBLICATIONS

Nagahashi, T., Fujiyoshi, H., Kanade, T., "Image Segmentation Using Iterated Graph Cuts Based on Multi-scale Smoothing," 2007, pp. 806-816.*

(Continued)

*Primary Examiner* — Christopher S Kelley
*Assistant Examiner* — Kathleen Walsh
(74) *Attorney, Agent, or Firm* — Renner, Otto, Boisselle & Sklar, LLP

(57) ABSTRACT

An image processor 7 includes: an in-focus area extracting section 72 that extracts an in-focus area of two images with parallax; a color conversion matrix calculating section 73 that obtains a color conversion matrix between the two images by reference to information about the colors of pixels that are included in the in-focus area of the two images; and a color conversion section 74 that converts the color of one of the two images by using the color conversion matrix.

9 Claims, 7 Drawing Sheets

(56) References Cited

U.S. PATENT DOCUMENTS

| | | | |
|---|---|---|---|
| 6,807,295 B1* | 10/2004 | Ono | G02B 23/2415 348/42 |
| 7,142,711 B2* | 11/2006 | Goto et al. | 382/167 |
| 7,573,489 B2* | 8/2009 | Davidson et al. | 345/646 |
| 7,633,537 B2* | 12/2009 | Hoshuyama | 348/272 |
| 7,636,473 B2* | 12/2009 | Imai et al. | 382/167 |
| 7,920,176 B2* | 4/2011 | Watanabe | 348/231.2 |
| 7,929,027 B2* | 4/2011 | Okamoto et al. | 348/231.2 |
| 8,004,732 B2* | 8/2011 | Sakaue | 358/534 |
| 8,027,533 B2* | 9/2011 | Li et al. | 382/167 |
| 8,253,818 B2* | 8/2012 | Hiramoto et al. | 348/222.1 |
| 8,285,036 B2* | 10/2012 | Hiramatsu | 382/165 |
| 8,311,362 B2* | 11/2012 | Tamaru | 382/275 |
| 8,325,220 B2* | 12/2012 | Ernst et al. | 348/43 |
| 8,326,084 B1* | 12/2012 | Marrion et al. | 382/285 |
| 8,417,029 B2* | 4/2013 | Ishida et al. | 382/166 |
| 8,432,391 B2* | 4/2013 | Ishibashi | 345/419 |
| 8,433,134 B2* | 4/2013 | Ishii | 382/167 |
| 8,538,144 B2* | 9/2013 | Benitez et al. | 382/167 |
| 8,600,129 B2* | 12/2013 | Seko et al. | 382/128 |
| 8,692,910 B2* | 4/2014 | Yoshino | 348/246 |
| 8,872,910 B1* | 10/2014 | Vaziri | 348/78 |
| 8,902,293 B2* | 12/2014 | Ishii et al. | 348/46 |
| 2002/0171740 A1* | 11/2002 | Seo | 348/207.99 |
| 2003/0063185 A1* | 4/2003 | Bell | 348/46 |
| 2005/0213128 A1* | 9/2005 | Imai et al. | 358/1.9 |
| 2006/0153447 A1* | 7/2006 | Ouchi | G06F 17/30247 382/173 |
| 2006/0280362 A1* | 12/2006 | Umeda | 382/167 |
| 2007/0253619 A1* | 11/2007 | Sawada et al. | 382/162 |
| 2008/0030597 A1* | 2/2008 | Olsen et al. | 348/227.1 |
| 2008/0211924 A1* | 9/2008 | Sugimori | 348/222.1 |
| 2008/0237553 A1* | 10/2008 | Miya et al. | 252/586 |
| 2009/0284627 A1* | 11/2009 | Bando | G06K 9/00201 348/273 |
| 2009/0310885 A1* | 12/2009 | Tamaru | 382/275 |
| 2010/0014781 A1* | 1/2010 | Liu | H04N 13/0022 382/285 |
| 2010/0066854 A1* | 3/2010 | Mather et al. | 348/222.1 |
| 2010/0098334 A1* | 4/2010 | Fukutomi | 382/167 |
| 2010/0171816 A1* | 7/2010 | Ko | 348/51 |
| 2010/0188537 A1* | 7/2010 | Hiramoto et al. | 348/294 |
| 2010/0194919 A1* | 8/2010 | Ishii et al. | 348/224.1 |
| 2010/0201705 A1* | 8/2010 | Takahashi et al. | 345/600 |
| 2010/0277626 A1* | 11/2010 | Yoshino | H04N 9/045 348/246 |
| 2010/0290697 A1* | 11/2010 | Benitez et al. | 382/154 |
| 2010/0309329 A1* | 12/2010 | Hiramoto | 348/222.1 |
| 2010/0328740 A1* | 12/2010 | Tsukada | 358/530 |
| 2011/0001840 A1* | 1/2011 | Ishii et al. | 348/222.1 |
| 2011/0018974 A1* | 1/2011 | Wang | H04N 13/0214 348/49 |
| 2011/0025825 A1* | 2/2011 | McNamer et al. | 348/46 |
| 2011/0026824 A1* | 2/2011 | Ishii | 382/167 |
| 2011/0050941 A1* | 3/2011 | Hiramoto et al. | 348/222.1 |
| 2011/0235910 A1* | 9/2011 | Soceanu et al. | 382/173 |
| 2011/0316983 A1* | 12/2011 | Hiramoto et al. | 348/49 |
| 2012/0002018 A1* | 1/2012 | Hiramoto et al. | 348/49 |
| 2012/0069195 A1* | 3/2012 | Chang et al. | 348/182 |

FOREIGN PATENT DOCUMENTS

| | | | |
|---|---|---|---|
| JP | 2003-134533 A | | 5/2003 |
| JP | 2009-276294 A | | 11/2009 |
| JP | 2010-038788 A | | 2/2010 |
| JP | 2010-079298 A | | 4/2010 |
| JP | 2011-145343 A | | 7/2011 |
| WO | WO 2004032052 A1 | * | 4/2004 |
| WO | WO 2010131499 A1 | * | 11/2010 |
| WO | 2011/083542 A1 | | 7/2011 |
| WO | 2011/083543 A1 | | 7/2011 |
| WO | WO 2011083543 A1 | * | 7/2011 |

OTHER PUBLICATIONS

International Search Report for corresponding International Application No. PCT/JP2012/004317 mailed Oct. 9, 2012.

Form PCT/ISA/237 for corresponding International Application No. PCT/JP2012/004317 dated Oct. 9, 2012.

Nagahashi et al.; "Image Segmentation Using Iterated Graph Cuts Based on Multi-scale Smoothing", Transactions of Information Processing Society of Japan CVIM, vol. 1, No. 2, pp. 10-20, 2008 (cited in [0068] of the specification).

* cited by examiner (a)

(b)

(c)

L IMAGE YET TO BE SUBJECTED
TO COLOR CONVERSION $$\begin{bmatrix} M00 & M01 & M02 \\ M10 & M11 & M12 \\ M20 & M21 & M22 \end{bmatrix} =$$

$\parallel$
Mc

L IMAGE SUBJECTED TO
COLOR CONVERSION

IMAGE PROCESSOR, 3D IMAGE CAPTURE DEVICE, IMAGE PROCESSING METHOD, AND IMAGE PROCESSING PROGRAM

TECHNICAL FIELD

The present application relates to a single-lens 3D image capturing technology for generating multiple images with parallax using a single optical system and a single image sensor.

BACKGROUND ART

Recently, the performance and functionality of digital cameras and digital movie cameras that use some solid-state image sensor such as a CCD and a CMOS (which will be sometimes simply referred to herein as an "image sensor") have been enhanced to an astonishing degree. In particular, the size of a pixel structure for use in a solid-state image sensor has been further reduced these days thanks to rapid development of semiconductor device processing technologies, thus getting an even greater number of pixels and drivers integrated together in a solid-state image sensor. As a result, the resolution of an image sensor has lately increased rapidly from around one million pixels to ten million or more pixels in a matter of few years. On top of that, the quality of an image captured has also been improved significantly as well.

As for display devices, on the other hand, LCD and plasma displays with a reduced depth now provide high-resolution and high-contrast images, thus realizing high performance without taking up too much space. And such video quality improvement trends are now spreading from 2D images to 3D images. In fact, 3D display devices that achieve high image quality, although they require the viewer to wear a pair of polarization glasses, have been developed just recently.

As for the 3D image capturing technology, a typical 3D image capture device with a simple arrangement uses an image capturing system with two cameras to capture a right-eye image and a left-eye image. According to the so-called "two-lens image capturing" technique, however, two cameras need to be used, thus increasing not only the overall size of the image capture device but also the manufacturing cost as well. To overcome such a problem, methods for capturing multiple images with parallax (which will be sometimes referred to herein as "multi-viewpoint images") by using a single camera have been researched and developed. Such a method is called a "single-lens image capturing method".

For example, Patent Document No. 1 discloses a technique for obtaining two images with parallax at the same time using color filters. FIG. 10 schematically illustrates the image capturing system disclosed in Patent Document No. 1. The image capturing system that uses that technique includes a lens 3, a lens diaphragm 19, a light beam confining plate 20 with two color filters 20a and 20b that have mutually different transmission wavelength ranges, and a photosensitive film 21. In this case, the color filters 20a and 20b may be filters that transmit red- and blue-based light rays, respectively.

In such an arrangement, the incoming light passes through the lens 3, the lens diaphragm 19 and the light beam confining plate 20 and produces an image on the photosensitive film. In the meantime, only red- and blue-based light rays are respectively transmitted through the two color filters 20a and 20b of the light beam confining plate 20. As a result, a magenta-based color image is produced on the photosensitive film by the light rays that have been transmitted through the two color filters. In this case, since the color filters 20a and 20b are arranged at mutually different positions, the image produced on the photosensitive film comes to have parallax. Thus, if a photograph is developed with the photosensitive film and viewed with a pair of glasses, in which red and blue films are attached to its right- and left-eye lenses, the viewer can view an image with depth. In this manner, according to the technique disclosed in Patent Document No. 1, multi-viewpoint images can be produced using the two color filters.

According to the technique disclosed in Patent Document No. 1, the light rays are imaged on the photosensitive film, thereby producing multiple images with parallax there. Meanwhile, Patent Document No. 2 discloses a technique for producing images with parallax by transforming incoming light into electrical signals. FIG. 11 schematically illustrates a light beam confining plate according to such a technique. Specifically, according to that technique, a light beam confining plate 22, which has a red ray transmitting R area 22R, a green ray transmitting G area 22G and a blue ray transmitting B area 22B, is arranged on a plane that intersects with the optical axis of the imaging optical system at right angles. And by getting the light rays that have been transmitted through those areas received by a color image sensor that has red-, green- and blue-ray-receiving R, G and B pixels, an image is generated based on the light rays that have been transmitted through those areas.

Patent Document No. 3 also discloses a technique for obtaining images with parallax using a similar configuration to the one used in Patent Document No. 2. FIG. 12 schematically illustrates a light beam confining plate as disclosed in Patent Document No. 3. According to that technique, by making the incoming light pass through R, G and B areas 23R, 23G and 23B of the light beam confining plate 23, multiple images with parallax can also be produced.

Patent Document No. 4 also discloses a technique for generating multiple images with parallax using a pair of filters with mutually different colors, which are arranged symmetrically to each other with respect to an optical axis. By using red and blue filters as the pair of filters, an R pixel that senses a red ray observes the light that has been transmitted through the red filter, while a B pixel that senses a blue ray observes the light that has been transmitted through the blue filter. Since the red and blue filters are arranged at two different positions, the light received by the R pixel and the light received by the B pixel have come from mutually different directions. Consequently, the image observed by the R pixel and the image observed by the B pixel are ones viewed from two different viewpoints. By defining corresponding points between those images on a pixel-by-pixel basis, the magnitude of parallax can be calculated. And based on the magnitude of parallax calculated and information about the focal length of the camera, the distance from the camera to the subject can be obtained.

Patent Document No. 5 discloses a technique for obtaining information about a subject distance based on two images that have been generated using either a diaphragm to which two color filters with mutually different aperture sizes are attached or a diaphragm to which two color filters in two different colors are attached horizontally symmetrically with respect to the optical axis. According to such a technique, if light rays that have been transmitted through the red and blue color filters with mutually different aperture sizes are observed, the degrees of blur observed vary from one color to another. That is why the degrees of blur of the two images that are associated with the red and blue color filters vary according to the subject distance. By defining corresponding points with respect to those images and comparing their degrees of blur to each other, information about the distance from the camera to the subject can be obtained. On the other hand, if light rays that have been transmitted through two color filters in two different colors that are attached horizontally symmetrically with respect to the optical axis are observed, the direction from which the light observed has come changes from one color to another. As a result, two images that are associated with the red and blue color filters become images with parallax. And by defining corresponding points with respect to those images and calculating the distance between those corresponding points, information about the distance from the camera to the subject can be obtained.

According to the techniques disclosed in Patent Documents Nos. 1 to 5 mentioned above, images with parallax can be produced by arranging RGB color filters on a light beam confining plate. However, since the light beam confining plate is used, the percentage of the incoming light that can be used decreases significantly. In addition, increase the effect of parallax, those RGB color filters should be arranged at distant positions and should have decreased areas. In that case, however, the percentage of the incoming light that can be used further decreases.

Unlike these techniques, Patent Document No. 6 discloses a technique for obtaining multiple images with parallax and a normal image that is free from the light quantity problem by using a diaphragm in which RGB color filters are arranged. According to that technique, when the diaphragm is closed, only the light rays that have been transmitted through the RGB color filters are received. On the other hand, when the diaphragm is opened, the RGB color filter areas are outside of the optical path, and therefore, the incoming light can be received entirely. Consequently, images with parallax can be obtained when the diaphragm is closed and a normal image that uses the incoming light highly efficiently can be obtained when the diaphragm is opened.

CITATION LIST

Patent Literature

Patent Document No. 1: Japanese Laid-Open Patent Publication No. 2-171737
Patent Document No. 2: Japanese Laid-Open Patent Publication No. 2002-344999
Patent Document No. 3: Japanese Laid-Open Patent Publication No. 2009-276294
Patent Document No. 4: Japanese Laid-Open Patent Publication No. 2010-38788
Patent Document No. 5: Japanese Laid-Open Patent Publication No. 2010-79298
Patent Document No. 6: Japanese Laid-Open Patent Publication No. 2003-134533

Non-Patent Literature

Non-Patent Document No. 1: "Image Segmentation Using Iterated Graph Cuts Based on Multi-scale Smoothing", Tomoyuki Nagahashi, Hironobu Fujiyoshi, and Takeo Kanade, Transactions of Information Processing Society of Japan CVIM, Vol. 1, No. 2, pp. 10-20, 2008.

SUMMARY OF INVENTION

Technical Problem

According to these technologies of the related art, images with parallax can be certainly obtained, but the quantity of the light received by the image sensor is much smaller than usual because primary color (RGB) based color filters are used. On the other hand, in order to use the incoming light sufficiently, a normal image that uses the incoming light highly efficiently needs to be obtained by using a mechanism that removes the color filter from the optical path by mechanical driving as disclosed in Patent Document No. 6. If such a mechanism is provided, however, the overall size of the device increases too much and the manufacturing cost becomes too high.

To overcome these problems, an embodiment of the present invention provides an image capturing technique for obtaining multi-viewpoint images with the incoming light used highly efficiently without making any mechanical driving.

Solution to Problem

An image processor as an embodiment of the present invention matches the colors of two images with parallax to each other. The processor includes: an in-focus area extracting section that extracts an in-focus area of the two images; a color conversion matrix calculating section that obtains a color conversion matrix between the two images by reference to information about the colors of pixels that are included in the in-focus area of the two images; and a color conversion section that converts the color of one of the two images by using the color conversion matrix.

This general and particular embodiment can be implemented as a system, a method, a computer program or a combination thereof.

Advantageous Effects of Invention

According to an embodiment of the present invention, multi-viewpoint images can be obtained without making any mechanical driving and with the light used more efficiently than ever.

Figure 1:
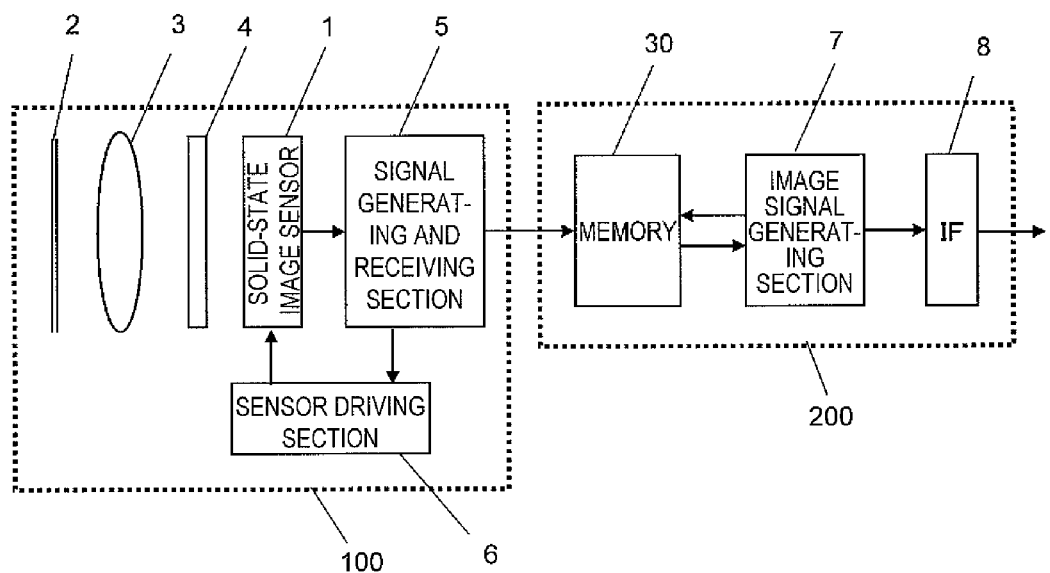
FIG. 1 A block diagram illustrating an overall configuration for a 3D image capture device according to an embodiment.

DESCRIPTION OF EMBODIMENTS (1) To overcome the problems described above, an image processor as an embodiment of the present invention matches the colors of two images with parallax to each other, and includes: an in-focus area extracting section that extracts an in-focus area of the two images; a color conversion matrix calculating section that obtains a color conversion matrix between the two images by reference to information about the colors of pixels that are included in the in-focus area of the two images; and a color conversion section that converts the color of one of the two images by using the color conversion matrix.

(2) In one embodiment, the image processor of (1) further includes a high frequency component calculating section that calculates the high frequency components of at least one of the two images. The in-focus area extracting section extracts the in-focus areas based on the high frequency components that have been calculated.

(3) In one embodiment of the image processor of (2), the in-focus area extracting section extracts, as the in-focus area, the vicinity of high frequency pixels in which the quantity of the high frequency components is greater than a predetermined threshold value.

(4) In one embodiment of the image processor of (3), the in-focus area extracting section extracts, as the in-focus area, a rectangular area comprised of n pixels×m pixels (where n and m are integers that are equal to or greater than one) including the high frequency pixels.

(5) In one embodiment of the image processor of (3), the in-focus area extracting section extracts, as the in-focus area, a rectangular area comprised of n pixels X m pixels (where n and m are integers that are equal to or greater than one) surrounding the high frequency pixels.

(6) In one embodiment of the image processor of one of (1), the color conversion matrix calculating section obtains the color conversion matrix by linear computations by the minimum square method, the M estimation method or the RAMSAC method.

(7) A 3D image capture device as an embodiment of the present invention includes: a light transmitting section that has two transmitting areas with mutually different spectral transmittance characteristics; an image sensor that is arranged to receive the light that has been transmitted through the light transmitting section and that includes two kinds of pixels with mutually different spectral transmittance characteristics; and an image processing section that generates two images with parallax based on pixel signals supplied from the image sensor. The image processing section includes: an in-focus area extracting section that extracts an in-focus area of the two images; a color conversion matrix calculating section that obtains a color conversion matrix between the two images by reference to information about the colors of pixels that are included in the in-focus area of the two images; and a color conversion section that converts the color of one of the two images by using the color conversion matrix.

(8) An image processing method as an embodiment of the present invention is designed to match the colors of two images with parallax to each other, and includes the steps of: extracting an in-focus area of the two images; obtaining a color conversion matrix between the two images by reference to information about the colors of pixels that are included in the in-focus area of the two images; and converting the color of one of the two images by using the color conversion matrix.

An image processing program as an embodiment of the present invention is designed to match the colors of two images with parallax to each other, and defined to make a computer perform the steps of: extracting an in-focus area of the two images; obtaining a color conversion matrix between the two images by reference to information about the colors of pixels that are included in the in-focus area of the two images; and converting the color of one of the two images by using the color conversion matrix.

Hereinafter, more specific embodiments of the present invention will be described with reference to the accompanying drawings. In the following description, any element shown in multiple drawings and having substantially the same function will be identified by the same reference numeral. It should be noted that a signal or information representing an image will be sometimes referred to herein as just an "image".

(Embodiments)

FIG. 1 is a block diagram illustrating an overall configuration for a 3D image capture device (which will be simply referred to herein as an "image capture device") as an embodiment of the present invention. The image capture device of this embodiment is a digital electronic camera and includes an image capturing section 100 and a signal processing section 200 that receives a signal from the image capturing section 100 and outputs a signal representing an image (i.e., an image signal).

The image capturing section 100 includes an image sensor 1 with a number of photosensitive cells that are arranged on its image capturing plane, a light-transmitting plate 2 which has two transmitting areas with mutually different transmission wavelength ranges, an optical lens 3 for producing an image on the image capturing plane of the image sensor 1, and an infrared cut filter 4. The image capturing section 100 further includes a signal generating and receiving section 5, which not only generates a fundamental signal to drive the image sensor 1 but also receives the output signal of the image sensor 1 and sends it to the signal processing section 200, and a sensor driving section 6 for driving the image sensor 1 in accordance with the fundamental signal generated by the signal generating and receiving section 5. The image sensor 1 is typically a CCD or CMOS sensor, which may be fabricated by known semiconductor device processing technologies. The signal generating and receiving section 5 and the sensor driving section 6 may be implemented as an LSI such as a CCD driver.

The signal processing section 200 includes an image signal generating section 7 for generating an image signal by processing the signal supplied from the image capturing section 100, a memory 30 for storing various kinds of data for use to generate the image signal, and an interface (I/F) section 8 for sending out the image signal thus generated to an external device. The image signal generating section 7 may be a combination of a hardware component such as a known digital signal processor (DSP) and a software program for use to perform image processing involving the image signal generation. The memory 30 may be a DRAM, for example. And the memory 30 not only stores the signal supplied from the image capturing section 100 but also temporarily retains the image data that has been generated by the image signal generating section 7 or compressed image data. These image data are then output to either a storage medium or a display section (neither is shown) by way of the interface section 8.

The image capture device of this embodiment actually further includes an electronic shutter, a viewfinder, a power supply (or battery), a flashlight and other known components. However, description thereof will be omitted herein because none of them are essential components that would make it difficult to understand how the present invention works unless they were described in detail. Also, this configuration is only an example. Thus, in this embodiment, additional components other than the light-transmitting plate 2, the image sensor 1 and the image signal generating section 7 may be implemented as an appropriate combination of known elements.

Next, the configuration of the image capturing section 100 will be described in further detail with reference to FIGS. 2 through 4.

Figure 2:
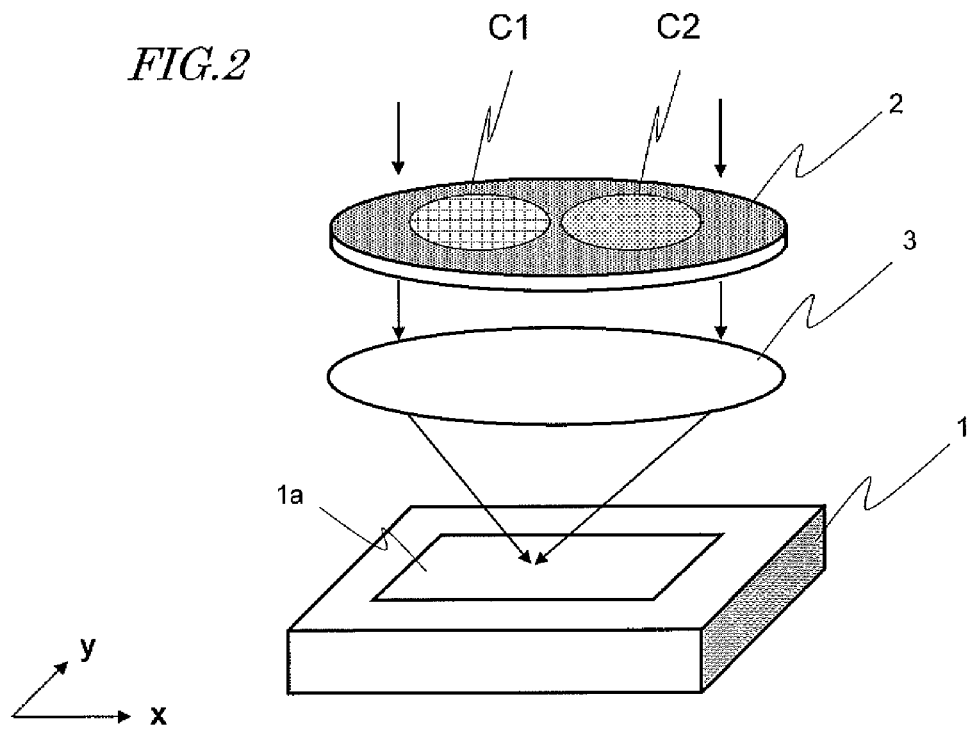
FIG. 2 A schematic representation generally illustrating the relative arrangement of a light-transmitting plate, an optical system and an image sensor according to the embodiment.

FIG. 2 schematically illustrates the relative arrangement of the light-transmitting plate 2, the lens 3 and the image sensor 1 in the image capturing section 100. It should be noted that illustration of the other elements is omitted in FIG. 2. The lens 3 may be a lens unit that is a group of lenses but is drawn in FIG. 2 as a single lens for the sake of simplicity.

The light-transmitting plate 2 includes two transmitting areas C1 and C2, of which the optical transmittances have mutually different wavelength dependences (i.e., which have mutually different spectral transmittances). The lens 3 is a known lens and condenses the light that has been transmitted through the light-transmitting plate 2, thereby imaging the light on the image capturing plane 1a of the image sensor 1. In this embodiment, the rest of the light-transmitting plate 2 other than the transmitting areas C1 and C2 is made of an opaque member.

Figure 3:
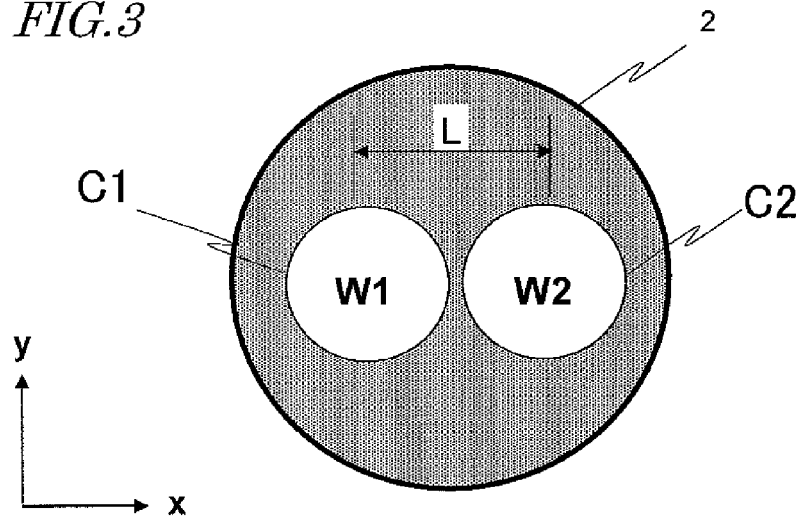
FIG. 3 A view illustrating an arrangement of transmitting areas on a light-transmitting plate according to the embodiment.

FIG. 3 is a front view of the light-transmitting plate 2 of this embodiment. The light-transmitting plate 2, as well as the lens 3, has a circular shape in this embodiment but may also have any other shape. In each of the areas C1 and C2, arranged is a filter W1, W2 that transmits a light ray falling within an arbitrary wavelength range included in the wavelength range of visible radiation. The transmittances of these filters W1 and W2 have mutually different wavelength dependences. That is to say, even if the same light has been transmitted through these filters, the light transmitted will have different brightness (or luminance) values, depending on whether the light has been transmitted through the area C1 or the area C2. As long as each filter W1, W2 has the function of transmitting the light at an intended transmittance, the filter may be made of any material. For example, the filters may be made of glass, plastic, cellophane or any other suitable material. Although the filters W1 and W2 of this embodiment transmit light rays falling within an arbitrary part of the wavelength range of visible radiation, the filters W1 and W2 do not always have to have such a characteristic. Optionally, one or both of the filters W1 and W2 may be configured not to transmit light falling within a part of the wavelength range of visible radiation.

These areas C1 and C2 are arranged with a certain gap left in the x direction. The distance L between the respective centers of these areas is determined by the size of the lens 3 so that the image obtained will have appropriate parallax, and may be set to be within the range of a few millimeters to several centimeters, for example. The areas C1 and C2 are generally arranged horizontally symmetrically with respect to the optical axis and have the same area. If such an arrangement is adopted, the quantities of the light rays to be incident on the areas C1 and C2 can be substantially equal to each other. If multi-viewpoint images with vertical parallax need to be obtained depending on the intended use, then these areas C1 and C2 may be arranged vertically (i.e., in the y direction).

Also, if the respective transmittances of the filters W1 and W2 arranged in the areas C1 and C2 are significantly different from each other, then the values of photoelectrically converted signals (i.e., pixel values) obtained by the respective photosensitive cells of the image sensor 1 (to be described later) will also be quite different. That is why the planar areas of those areas C1 and C2 may be adjusted so that two images with parallax will have close brightness values. Alternatively, by using a filter that evenly decreases the transmittance of every light ray falling within the visible radiation range (such as an ND filter) along with the light-transmitting plate 2, the intensities of the light ray transmitted through these areas C1 and C2 may be adjusted to be approximately equal to each other.

On the image capturing plane 1a of the image sensor 1 shown in FIG. 2, there is an array of photosensitive cells that are arranged two-dimensionally and an array of transmitting filters that are arranged to face those photosensitive cells in the array. The array of photosensitive cells and the array of transmitting filters consist of multiple unit elements.

Each of those photosensitive cells is typically a photodiode, which performs photoelectric conversion and outputs an electrical signal representing the quantity of the light received (which will be referred to herein as a "photoelectrically converted signal" or a "pixel signal"). On the other hand, each transmitting filter may be made of known pigment or a stack of dielectric materials and is designed so as to transmit at least a part of the incoming light. In the following description, the fundamental principle of this embodiment will be described on the supposition that each unit element includes two types of transmitting filters.

Figure 4:
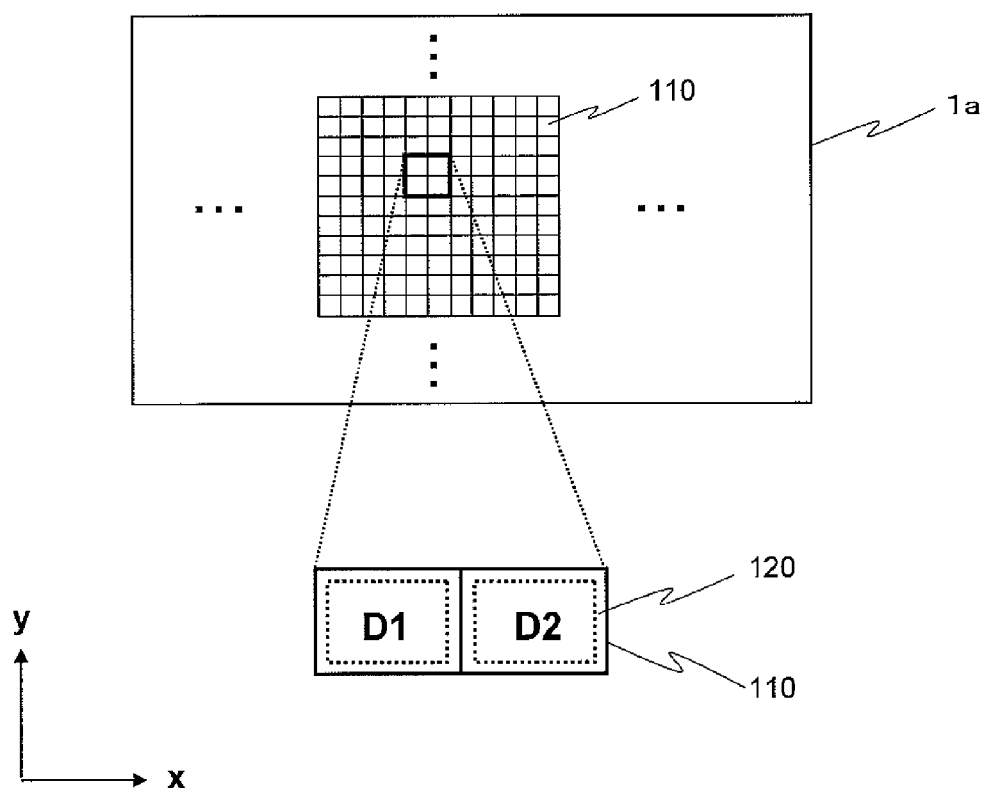
FIG. 4 A view illustrating a basic arrangement of transmitting filters in the image sensor according to the embodiment.

FIG. 4 is a top view schematically illustrating a portion of the array of transmitting filters according to this embodiment. As shown in FIG. 4, a lot of transmitting filters 110 are arranged in columns and rows on the image capturing plane 1a. Each unit element is formed of two transmitting filters 110 that are arranged close to each other and two photosensitive cells 120 that face them. The two transmitting filters D1 and D2 that are included in each unit element both transmit a light ray with an arbitrary wavelength falling within the visible radiation wavelength range but have mutually different spectral transmittances. That is to say, each of the transmitting filters D1 and D2 transmits a light ray falling within the red (R), green (G) or blue (B) wavelength range but their transmittances have mutually different wavelength dependences. In the example illustrated in FIG. 4, two photosensitive cells 120 included in each unit element are arranged horizontally (i.e., in the x direction). However, this is only an example of the present invention and the photosensitive cells may also be arranged in the image sensor 1 in any other known pattern.

According to such an arrangement, the light that has entered this image capture device during an exposure process passes through the light-transmitting plate 2, the lens 3, the infrared cut filter 4 and the transmitting filters 110 and then is incident on the photosensitive cells 120. Each of those photosensitive cells 120 receives a light ray that has been transmitted through the area C1 or C2 of the light-transmitting plate 2 and then through its associated transmitting filter, and outputs a photoelectrically converted signal representing the quantity of the light received. The photoelectrically converted signal that has been output from each photosensitive cell is sent to the signal processing section 200 by way of the signal generating and receiving section 5. In the signal processing section 200, the image signal generating section 7 generates images with parallax based on the signals supplied from the image capturing section 100.

Hereinafter, the photoelectrically converted signals supplied from those photosensitive cells 120 will be described. Signals representing the respective intensities of light rays that have been transmitted through the areas C1 and C2 of the light-transmitting plate 2 will be identified herein by Ci1 and Ci2, respectively, with the subscript "i" attached. In this case, the rest of the incoming light other than the visible radiation is supposed to have been cut. Also, according to this embodiment, this incoming light is supposed to include light rays with every wavelength falling within the visible radiation range in equal quantities. The spectral transmittance of the lens 3 and the infrared cut filter 4 combined will be identified herein by Tw. And the spectral transmittances of the W1 and W2 filters of the areas C1 and C2 will be identified herein by TC1 and TC2, respectively. Both of the filters W1 and W2 transmit a light ray with an arbitrary wavelength falling within the visible radiation range but their transmittances vary according to the wavelength. That is to say, although both of the filters W1 and W2 transmit R, G and B rays, these color components are transmitted in mutually different percentages by the two filters. In the same way, the spectral transmittances of the transmitting filters D1 and D2 at the image sensor 1 will be identified herein by TD1 and TD2, respectively. Just like TC1 and TC2, the transmittances TD1 and TD2 also vary according to the wavelength. But the transmitting filters have a property to transmit R, G and B rays. That is why according to this embodiment, at least a part of the R, G and B components included in the incoming light is transmitted through all of those four filters C1, C2, D1 and D2. That is why each of the two photosensitive cells that face the transmitting filters D1 and D2 of the image sensor 1 can obtain a signal in which the three color components of R, G and B are superposed one upon the other.

In this case, Tw, TC1, TC2, TD1 and TD2 are functions that depend on the wavelength λ of the incoming light. And the signals representing the intensities of light rays that have been transmitted through the transmitting filters D1 and D2 and then received by photosensitive cells that face them are identified by d1 and d2, respectively. Furthermore, the integration operation of the spectral transmittances in the visible radiation wavelength range will be identified herein by the sign Σ. For example, an integration operation ∫TwTC1TD1dλ with respect to the wavelength λ will be identified herein by Σ TwTC1TD1. In this case, the integration is supposed to be performed in the entire visible radiation wavelength range. Then, d1 is proportional to the sum of Ci1 Σ TwTC1TD1 and Ci2 Σ TwTC2TD2. Likewise, d2 is proportional to the sum of Ci1 Σ TwTC1TD2 and Ci2 Σ TwTC2TD2. Supposing the constant of proportionality with respect to these relations is one, d1 and d2 can be represented by the following Equations (1) and (2), respectively:

$$d1 = Ci1 \ \Sigma TwTC1TD1 + Ci2 \Sigma TwTC2TD1 \quad (1)$$

$$d2 = Ci1 \Sigma TwTC1TD2 + Ci2 \Sigma TwTC2TD2 \quad (2)$$

Suppose, in Equations (1) and (2), Σ TwTC1TD1, Σ TwTC2TD1, Σ TwTC1TD2, and Σ TwTC2TD2 are identified by Mx11, Mx12, Mx21 and Mx22, respectively. Then, Equation (1) can be represented by the following Equation (3) using a matrix:

$$\begin{pmatrix} d1 \\ d2 \end{pmatrix} = \begin{pmatrix} M \times 11 & M \times 12 \\ M \times 21 & M \times 22 \end{pmatrix} \begin{pmatrix} Ci1 \\ Ci2 \end{pmatrix} \quad (3)$$

Supposing the respective elements of an inverse matrix, which is obtained by inverting the matrix consisting of the elements Mx through Mx22 as represented by Equation (3), are identified by iM11 through iM22, respectively, Equation (3) can be modified into the following Equation (4). That is to say, the signals representing the intensities of the light rays that have been incident on the areas C1 and C2 can be represented by using the photoelectrically converted signals d1 and d2:

$$\begin{pmatrix} Ci1 \\ Ci2 \end{pmatrix} = \begin{pmatrix} iM \times 11 & iM \times 12 \\ iM \times 21 & iM \times 22 \end{pmatrix} \begin{pmatrix} d1 \\ d2 \end{pmatrix} \quad (4)$$

By this Equation (4), signals representing the intensities of light rays that have been transmitted through the areas C1 and C2 can be obtained by using the pixel signals d1 and d2 generated by shooting an image. Since the areas C1 and C2 are spaced apart from each other in the x direction, images produced based on the light rays that have been incident on the areas C1 and C2, respectively, become two images viewed from different viewpoints. Consequently, those signals representing the intensities of light rays that have come from two different positions and that have been generated as a result of the processing described above form multi-viewpoint images.

In order to generate multi-viewpoint images by such a method, pixel signals need to be obtained from two photosensitive cells per unit element. A condition for calculating multi-viewpoint images based those pixel signals supplied from the two photosensitive cells is that the transmitting filters D1 and D2 have mutually different spectral transmittances in the visible radiation range. That is why according to this embodiment, the configuration shown in FIG. 4 does not have to be adopted but a configuration shown in FIG. 5 in which each unit element is comprised of four photosensitive cells and four transmitting filters D1, R, G and B that are arranged to face them may also be adopted. Even so, multi-viewpoint images can also be calculated in the same way as will be described below.

Figure 5:
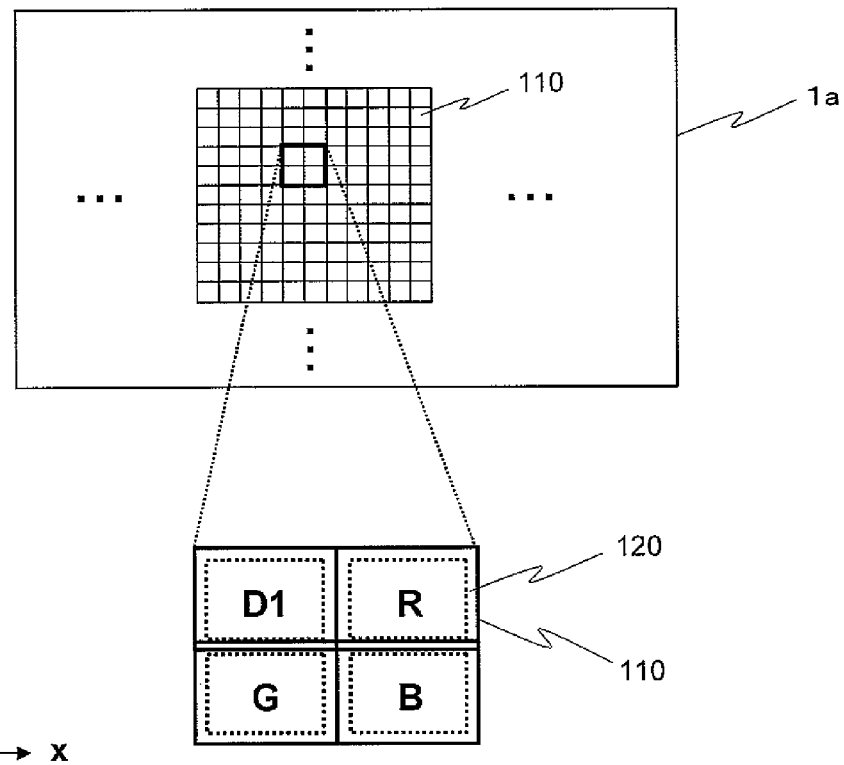
FIG. 5 A view illustrating a basic arrangement of transmitting filters in the color image sensor according to the embodiment.

The transmitting filters R, G and B shown in FIG. 5 are designed so as to respectively transmit red, green and blue components of incoming light. In this case, the red component refers to a light ray falling within the range of approximately 600 to 700 nm. The green component refers to a light ray falling within the range of approximately 500 to 600 nm.

And the blue component refers to a light ray falling within the range of approximately 400 to 500 nm. However, this definition is adopted just for the sake of convenience. And it may be determined appropriately which color component corresponds to what wavelength range. The transmitting filter D1 shown in FIG. 5 is the same as the filter D1 shown in FIG. 4. The filter D1 may be a transparent filter, for example. And the sum of the pixel signals supplied from the three photosensitive cells that face the transparent filters R, G and B is regarded as a single pixel signal d2. Thus, the pixel signal d1 supplied from the photosensitive cell that faces the transparent filter D1 and the pixel signal d2 include RGB color components in different percentages. In this manner, multi-viewpoint images can be calculated as in the method that has already been described with reference to FIG. 4.

The image sensor 1 shown in FIG. 5 further includes photosensitive cells that sense R, G and B rays, respectively (i.e., R, G and B pixels). Thus, a color image can be generated based on the color information that has been obtained from these pixels. By adding color information obtained from the R, G and B pixels to the luminance signals Ci1 and Ci2 representing the multi-viewpoint images obtained by the method described above, color multi-viewpoint images can be obtained. Supposing the luminance signals representing the multi-viewpoint images are identified by Y1 (=Ci1) and Y2 (=Ci2), respectively, the signals obtained from the R and B pixels are identified by Rs and Bs, respectively, and the sum of the luminance signals Y1 and Y2 is YL=Y1+Y2, the color difference signals are given by (YL−Rs) and (YL−Bs), respectively. After these color difference signals have been generated, these color difference signals are turned into low-frequency ones by a band-pass filter and then superposed on the multi-viewpoint image signals Ci1 and Ci2, thereby obtaining color multi-viewpoint images.

In this case, the R, G and B values of the image representing the light that has been transmitted through the area C1 are identified by IMG(L)r, IMG(L)g and IMG(L)b, respectively, and the R, G and B values of the image representing the light that has been transmitted through the area C2 are identified by IMG(R)r, IMG(R)g and IMG(R)b, respectively. Then, these values can be calculated by the following Equations (5) and (6). In Equations (5) and (6), M represents a 3×3 conversion matrix for transforming the luminance signal Y1 or Y2 and the two color difference signals YL−Rs and YL−Bs into the RGB values of each image.

$$\begin{pmatrix} IMG(L)r \\ IMG(L)g \\ IMG(L)b \end{pmatrix} = M \begin{pmatrix} Y1 \\ YL - Rs \\ YL - Bs \end{pmatrix} \quad (5)$$

$$\begin{pmatrix} IMG(R)r \\ IMG(R)g \\ IMG(R)b \end{pmatrix} = M \begin{pmatrix} Y2 \\ YL - Rs \\ YL - Bs \end{pmatrix} \quad (6)$$

By performing the processing represented by Equations (5) and (6), color image signals can be obtained based on the luminance signals and the color difference signal. The image signal generating section 7 calculates these image signals on a unit element basis, thereby generating color multi-viewpoint images.

As can be seen, according to this method, both of the transmitting areas C1 and C2 provided for the light-transmitting plate 2 (or diaphragm) transmit at least partially a light ray falling within each of the R, G and B wavelength ranges. That is why the output signals of the R, G and B pixels of the image sensor 1 include RGB information of the light that has been transmitted through the area C1 and the RGB information of the light that has been transmitted through the area C2. As a result, a color difference signal can be calculated based on these pixel signals.

However, as the transmitting areas C1 and C2 provided for the light-transmitting plate 2 have mutually different spectral transmittances, the percentages of the R, G and B components included in the light transmitted through the area C1 are different from those of the R, G and B components included in the light transmitted through the area C2. That is why the luminance signals of multi-viewpoint images, which are signals representing the quantities of light transmitted, are also different between the areas C1 and C2. As a result, the colored multi-viewpoint images also have different colors. And if a 3D image is generated using such two color-shifted images as left- and right-eye images, the 3D image will look unnatural to the viewer.

Thus, to avoid such a problem, the image signal generating section 7 of this embodiment obtains a conversion matrix representing the difference in color between the two colored multi-viewpoint images and makes color correction so that the color of one of the two multi-viewpoint images matches that of the other. As a result, the color difference between the two images can be reduced.

To obtain a conversion matrix for converting the color of one of two images viewed from mutually different viewpoints into that of the other, pixels should be associated with each other between the two images and then a color conversion matrix should be obtained between the associated pixels. In order to overcome such a problem, according to this embodiment, attention is paid to the face that the magnitude of parallax is zero at in-focus pixels of the multi-viewpoint images. In associating pixels during an image matching process, no pixels are likely to be associated with each other successfully in an image area where there are no edges. On the other hand, it is easy to find in-focus pixels. For example, as a general digital camera or digital movie usually has an auto-focus function, it is easy to get information about which area of the image is now in focus.

Once the correspondence between the pixels is known, the image signal generating section 7 gets the R, G and B values of those pixels, and obtains a matrix for converting the color of one of the two multi-viewpoint images into that of the other based on the difference in R, G and B values between the associated pixels. After that, by using the conversion matrix thus obtained, the image signal generating section 7 makes color conversion on one of the two multi-viewpoint images entirely. Hereinafter, this color conversion processing will be described in detail.

A pair of associated pixels between two multi-viewpoint images refer herein to two pixels representing the same point in a three-dimensional space in the reference one of the multi-viewpoint images and the other image. If two pixels represent the same point in a three-dimensional space, then those two pixels should naturally represent the same color. According to this embodiment, however, since the areas C1 and C2 of the light-transmitting plate 2 have mutually different spectral transmittances, the multi-viewpoint images that have been shot through these areas C1 and C2 ordinarily have different pixel values even if the light has come from the same point in a three-dimensional space. That is why it is difficult to apply a normal matching method such as block matching to be adopted in a known stereoscopic method.

Figure 6:
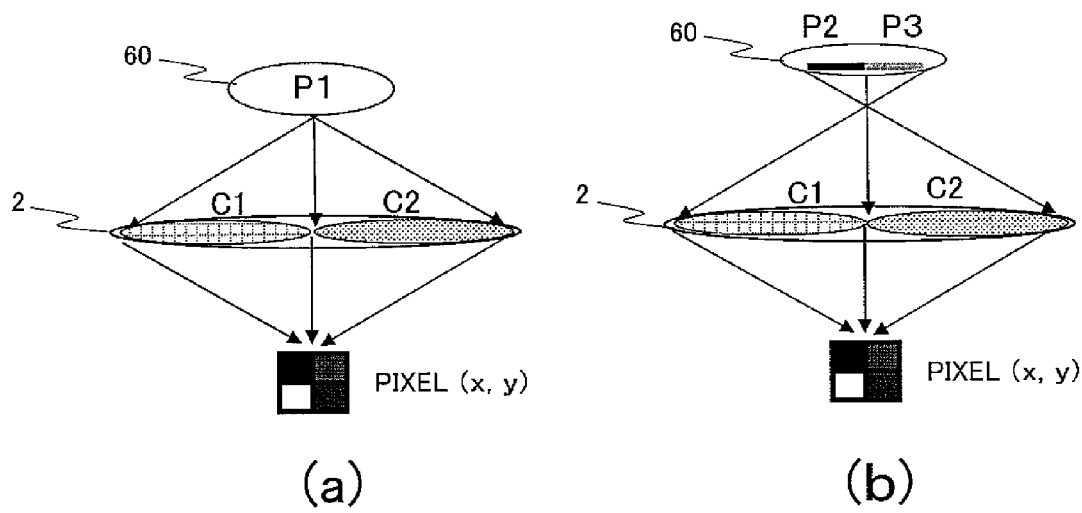
FIG. 6 Illustrates how the subject comes into, and out of, focus according to the embodiment.

FIG. 6 illustrates, as an example, how incoming light is imaged. Specifically, FIG. 6 illustrates an exemplary situation where light that has come from a subject 60 is incident on a pixel (x, y) of the image sensor 1 through the light-transmitting plate 2 which is split into two areas C1 and C2. In this example, (x, y) represents a pair of coordinates on the image capturing plane. FIG. 6(a) illustrates a situation where the focus is right on the subject 60, while FIG. 6(b) illustrates a situation where the focus is found before the subject 60. In the latter case, the subject 60 observed looks blurred. In this case, if two image signals Ci1 and Ci2 are calculated by making computations on the pixel (x, y) in the state shown in FIG. 6(a), both of the two image signals can be obtained as luminance signals representing the light that has come from the same point P in a three-dimensional space. In the state shown in FIG. 6(b), on the other hand, the light that has passed through the area C1 has come from a portion P3 of the subject 60 in the three-dimensional space and the light that has passed through the area C2 has come from another portion P2 of the subject 60 in the three-dimensional space. Thus, in the situation shown in FIG. 6(b), the two image signals Ci1 and Ci2 do not represent the same point in the three-dimensional space at the pixel (x, y) As can be seen, since the image signals Ci1 and Ci2 represent the same point in a three-dimensional space at an in-focus pixel of an image, it can be said that such a pixel has no parallax. Consequently, it can be seen that in the method of calculating multi-viewpoint images according to this embodiment, the problem of searching for corresponding points is equivalent to finding in-focus pixels from an image.

Figure 7A:
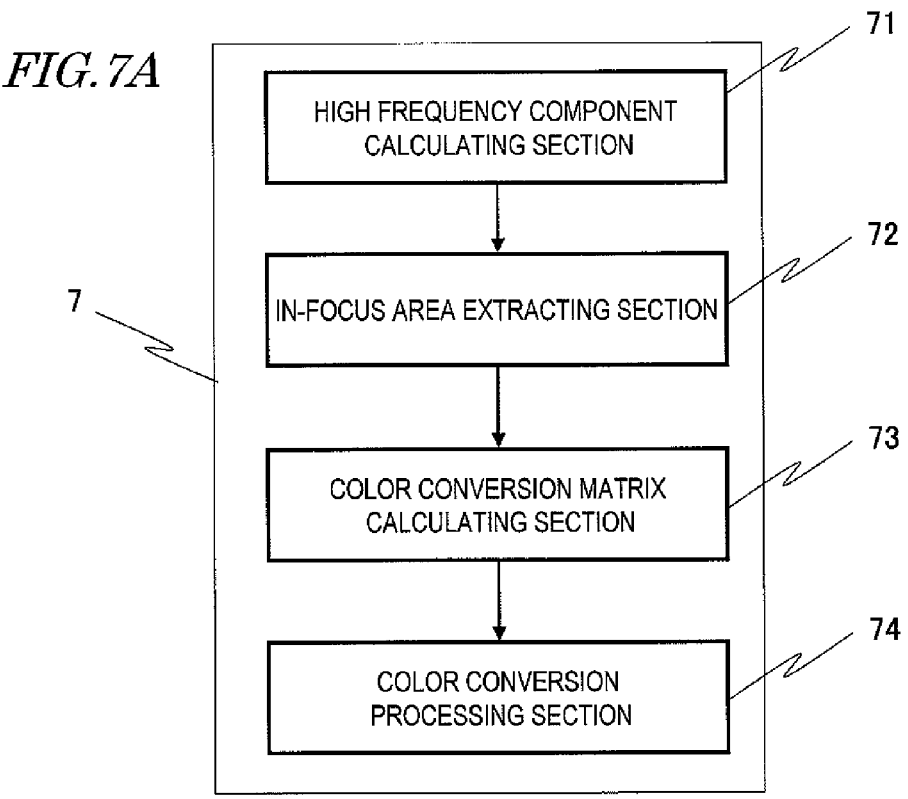
FIG. 7A Shows an arrangement of functional blocks in an image signal generating section according to the embodiment.
Figure 7B:
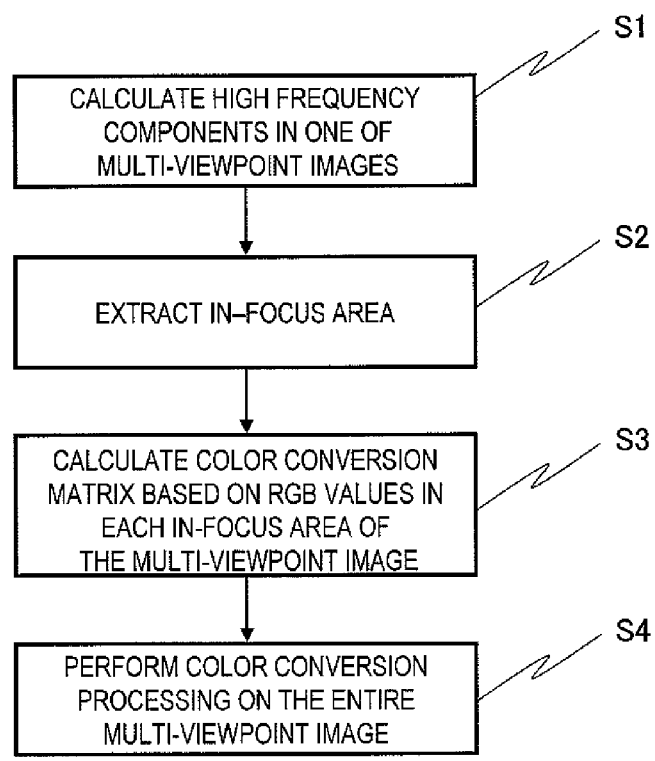
FIG. 7B A flowchart showing the procedure of the color conversion processing to be carried out by the image signal generating section according to the embodiment.

In view of these considerations, in order to obtain a color conversion matrix, first of all, multi-viewpoint images are searched for in-focus pixels according to this embodiment. Next, at each of those in-focus pixels, a color conversion matrix is obtained between the two images. And by converting the color of the reference one of the two images by using the conversion matrix, color correction is made. In this manner, according to the method of this embodiment, a color conversion matrix is obtained from a limited number of in-focus pixels. Since an important subject in an image is often focused on generally speaking, the corresponding point search method of this embodiment works fine. according to this embodiment FIG. 7A shows an arrangement of functional blocks in the image signal generating section 7 that performs the method described above. As shown in FIG. 7A, the image signal generating section 7 includes a high frequency component calculating section 71, an in-focus area extracting section 72, a color conversion matrix calculating section 73, and a color conversion processing section 74. FIG. 7B is a flowchart showing the procedure of the color conversion processing to be carried out by the image signal generating section 7. Hereinafter, the respective processing steps will be described in detail.

Figure 8:
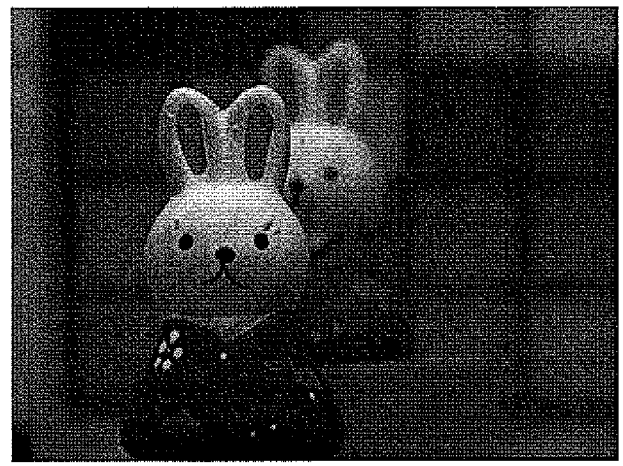
FIG. 8 (a) shows one of the multi-viewpoint images according to the embodiment, (b) illustrates the high frequency components extracted, and (c) illustrates exemplary in-focus areas calculated.
Figure 8:
Figure 8:

First of all, in order to search the multi-viewpoint images for in-focus pixels, the image signal generating section 7 makes the high frequency component calculating section 71 calculate high frequency components in the image (in Step S1). FIG. 8 illustrates how to extract high frequency components. Specifically, FIG. 8(a) shows one of the multi-viewpoint images and FIG. 8(b) illustrates the high frequency components extracted. In FIG. 8(b), the brighter a pixel is, the more high frequency components the pixel includes. The high frequency component calculating section 71 detects a pixel, of which the high frequency components have a quantity that is equal to or greater than a predetermined threshold value, as a "high frequency pixel".

As a method for extracting high frequency components, pixels, of which the pixel values vary significantly in an image space, may be extracted by using some known edge extraction filter such as a sobel filter or a Laplacian filter. Alternatively, an image represented in a frequency space through a Fourier transform may be subjected to high-pass filter processing and then subjected to inverse Fourier transform. According to this embodiment, any of these methods may be adopted as long as the high frequency components of an image can be calculated.

Next, the image signal generating section 7 makes the in-focus area extracting section 72 extract in-focus areas (in Step S2). The high frequency pixels that have been detected by the high frequency component calculating section 71 represent the contour of the in-focus subject. Since an in-focus area is located in the vicinity of high frequency pixels, the in-focus area extracting section 72 of this embodiment extracts a rectangular area consisting of n pixels×m pixels (where n and m are integers that are equal to or greater than one) and including the high frequency pixels as an in-focus area. For example, a rectangular area consisting of n pixels×m pixels that surround the high frequency pixels may be extracted as an in-focus area. If the subject image in the in-focus area includes a lot of high frequency components, n and m may be set to be smaller values. Then, it is possible to prevent an out-of-focus portion (i.e., an out-of-focus area) from forming part of the in-focus area extracted with more certainty than a situation where n and m are set to be large values. On the other hand, if the subject includes a little high frequency components, then n and m are suitably set to be large values in order to get a number of corresponding points that is large enough to calculate the color conversion matrix. To prevent such an out-of-focus area from forming part of the in-focus area extracted, the center of the rectangular area does not have to be the center of the high frequency pixels but a rectangular area consisting of n pixels×m pixels that extend from the high frequency pixels toward the center of the image may be used as the in-focus area. This method uses a priori knowledge that a subject to be focused on (i.e., a subject that a shooter pays attention to) often appears at the center of an image. Also, if it is known in advance, by using the face recognition technology that is often adopted in recent digital cameras, that the in-focus contour is a face area, that face area may be used as the in-focus area as well.

The white frames shown in FIG. 8(c) indicate examples of in-focus areas. Since the magnitude of parallax is zero in the in-focus areas, the in-focus area calculating processing step described above may be performed on only one of the two multi-viewpoint images. Such in-focus areas do not have to be rectangular areas but may also have any other shape such as polygonal, circular, or elliptical ones. In the example shown in FIG. 6(c), six in-focus areas are extracted. However, the number of in-focus areas to extract may also be determined arbitrarily.

Optionally, the in-focus area extracting section 72 may also extract an in-focus area based on the difference between the value of a pixel surrounding the high frequency pixels and that of a pixel that is far away from the high frequency pixels. For example, as in the method disclosed in Non-Patent Document No. 1, it may be determined, by the segmentation method that uses the similarity between pixel values, whether a given pixel belongs to an in-focus area or not. According to this method, based on color information of a background sampled and color information of the foreground, the degrees of likelihood (or similarity) of foreground and background are calculated. And by the graph cut method that uses these degrees of similarity, the image is divided into multiple areas to determine whether each pixel belongs to the foreground or the background. That is to say, pixels which have turned out to be similar to pixels near the high frequency pixels in the divided areas may be regarded as belonging to the in-focus area.

Although an in-focus area is extracted according to this embodiment based on the high frequency components of an image, there is no need to calculate the high frequency components if the in-focus area can be detected by another method. For example, in a special situation where the distance from the image capture device to the subject is known in advance, the in-focus area may be detected based on that distance and the focal length of the optical system.

Next, the image signal generating section 7 makes the color conversion matrix calculating section 73 calculate a color conversion matrix (in Step S3). In the in-focus area that has been obtained by the in-focus area extracting section 72, RGB values are obtained from each of the two multi-viewpoint images and a color conversion matrix for converting the RGB values of one of the two images into those of the other image is calculated. In this example, the two multi-viewpoint images are identified by IMG(L) and IMG(R), respectively. The RGB values in the in-focus area of the one image IMG(L) are identified by IMG(L)r(i, j), IMG(L)g(i, j), and IMG(L)b(i, j), respectively. On the other hand, the RGB values of the other image IMG(R) are identified by IMG(R)r(i, j), IMG(R)g(i, j), and IMG(R)b(i, j), respectively. It should be noted that the subscripts i and j indicate the coordinates of a pixel in the in-focus area obtained by the in-focus area extracting section 72. By using these RGB values, a color conversion matrix for converting the respective color values of IMG(L) into those of IMG(R) may be obtained by the following Equation (7):

$$\begin{bmatrix} IMG(L)r(i, j) & IMG(L)g(i, j) & IMG(L)b(i, j) \\ IMG(L)r(i+1, j) & IMG(L)g(i+1, j) & IMG(L)b(i+1, j) \\ IMG(L)r(i+2, j) & IMG(L)g(i+2, j) & IMG(L)b(i+2, j) \\ \ldots \end{bmatrix} Mc = \begin{bmatrix} IMG(R)r(i, j) & IMG(R)g(i, j) & IMG(R)b(i, j) \\ IMG(R)r(i+1, j) & IMG(R)g(i+1, j) & IMG(R)b(i+1, j) \\ IMG(R)r(i+2, j) & IMG(R)g(i+2, j) & IMG(R)b(i+2, j) \\ \ldots \end{bmatrix} \quad (7)$$

In Equation (7), the conversion matrix Mc is a 3×3 matrix. If the number of pixels of the in-focus area is n', then the RGB value matrices on the left and right sides of Equation (7) become n'×3 matrices. If n' is less than three, no conversion matrix can be obtained. However, since a situation where the in-focus area is made up of only two pixels rarely arises, the conversion matrix can be ordinarily obtained with no problem. If n'≥3, the conversion matrix Mc may be obtained simply by the minimum square method. Speaking intuitively, according to the minimum square method, the conversion matrix Mc is obtained so as to minimize the sum of squared errors between the product of the inverse matrix of the conversion matrix Mc to obtain and the matrix consisting of the color signals of IMG(R) and the matrix consisting of the color signals of IMG(L). According to this method, if noise was included in the color of IMG(R) or in the color of IMG(L), a conversion matrix that would minimize those errors should be obtained, and therefore, color conversion could not be carried out properly in some cases. As it is generally not easy to find such noise, such a problem may be coped with by a robust statistic based method such as the M estimation method. According to the M estimation method, in obtaining the likelihood of a conversion matrix, not squared errors but the output value of a predetermined error function is used. The evaluation formulae of the minimum square method and the M estimation method are as follows:

minimum square method: $\min \Sigma \in^2$

M estimation method: $\min \Sigma \rho(\in)$

As the function $\rho$ for use in the M estimation method, used generally is a function, of which the output value increases as the error $\in$ decreases, and decreases as the error $\in$ increases. Typical examples of such functions include a German and McClure's $\rho$ function. As a result, the influence of an element with a significant error diminishes, and therefore, a conversion matrix which is robust against noise can be estimated.

The L Med S method is another robust statistic based method, and is also called a "minimum center value method", by which a conversion matrix is obtained so as to minimize the center value of errors. According to the L Med S method, a conversion matrix is obtained and the errors $\in$ in the in-focus area are obtained on a pixel by pixel basis as in the method described above. The errors thus obtained are sorted and then a center value is obtained. For example, if the in-focus area is made up of 100 pixels, 100 errors are obtained on a pixel by pixel basis from the in-focus area and sorted out, and then the $50^{th}$ error value is extracted. According to this method, if the noise is less than 50%, the error of the center value obtained from a proper conversion matrix is the error obtained from a pixel that is not affected by noise in principle. Consequently, the estimation can get done while being hardly affected by noise.

Also, if the RGB value distribution in the in-focus area were biased, then a conversion matrix could not be obtained as intended by the minimum square method. In that case, the conversion matrix may be estimated by another robust statistic based method called "RANSAC (random sample consensus) method". According to this method, first of all, three or more pixels in the in-focus area of multi-viewpoint images are sampled, thereby obtaining a color conversion matrix for converting the color of IMG(L) into that of IMG(R). If the color conversion matrix obtained is a proper one, the color of IMG(R) is converted into that of IMG(L) by using the inverse matrix of the color conversion matrix on pixels that have not been sampled. If the magnitude of error becomes minimum when the color of the original IMG(L) is compared to that of IMG(L) obtained by converting IMG(R), then the color conversion matrix obtained is regarded as a proper one. According to this method, if no noise is included at a sample point from which the color conversion matrix is obtained for the first time or if the color distribution is not biased, then the color conversion matrix can be obtained properly.

Finally, the image signal generating section 7 makes the color conversion processing section 74 perform the color conversion processing using the color conversion matrix that has been obtained by the method described above (in Step S4). The color conversion can be carried out by converting the RGB values IMG(L)r, IMG(L)g, and IMG(L)b of all pixels of the left-eye one of the multi-viewpoint images using the conversion matrix Mc.

Figure 9:
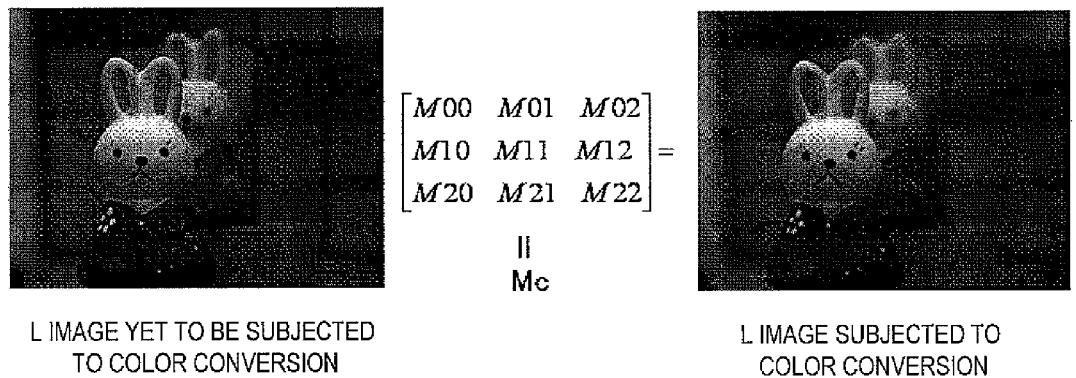
FIG. 9 Illustrates conceptually how to perform the processing of converting, using a conversion matrix Mc, the colors of respective pixels of an L image yet to be subjected to a color conversion.
Figure 10:
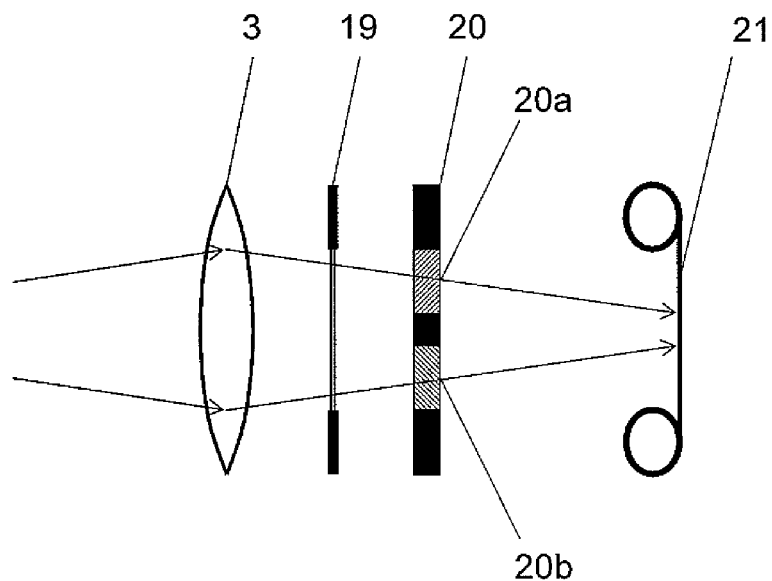
FIG. 10 A view illustrating the arrangement of an image capturing system according to a patent document.
Figure 11:
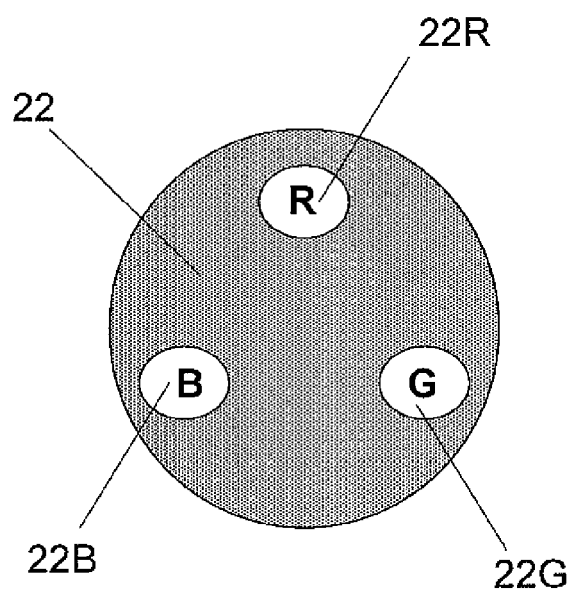
FIG. 11 A view illustrating the appearance of a light beam confining plate according to another patent document.
Figure 12:
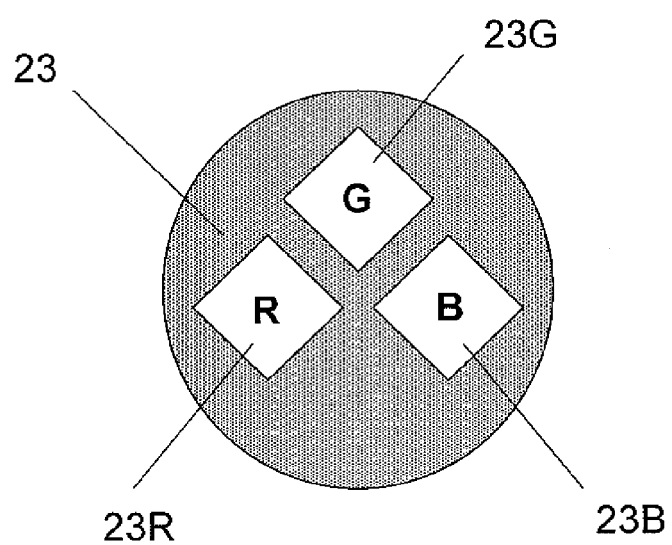
FIG. 12 A view illustrating the appearance of a light beam confining plate according to still another patent document.

FIG. 9 illustrates conceptually how to perform the processing of converting, using a conversion matrix Mc, the colors of respective pixels of the image on the left-hand side yet to be subjected to the color conversion. As shown in FIG. 9, by converting the entire left (L) image using the conversion matrix Mc that has been obtained by comparing the L image to the right (R) image in an in-focus area, a color converted L image is generated. If the left image is replaced with that color-converted L image, a left image, of which the color matches that of the right image, can be obtained. As a result, a more natural 3D image can be generated.

As described above, the image capture device of this embodiment can generate multi-viewpoint images by using the light-transmitting plate 2 having two transmitting areas with mutually different spectral transmittances and the image sensor 1 having two or more kinds of transmitting filters with mutually different spectral transmittances. In particular, the image signal generating section 7 of this embodiment obtains a color conversion matrix in an in-focus area of the multi-viewpoint images and corrects the color of one of the two images entirely by using the color conversion matrix. As a result, the colors of the multi-viewpoint images can be matched to each other relatively easily.

In the embodiments described above, each of the filters W1 and W2 arranged in the areas C1 and C2 of the light-transmitting plate 2 and the filters D1 and D2 of the image sensor 1 has a property of transmitting at least partially a light ray representing every color component of RGB. However, according to the present invention, such filters do not always have to be used. Even when filters that cut light rays representing some color components are used, the color conversion processing of this embodiment can also be used.

In the embodiments described above, the light-transmitting plate 2 has only two transmitting areas C1 and C2 but may have three or more transmitting areas. Even if the light-transmitting plate 2 has three or more transmitting areas, two images associated with two arbitrary transmitting areas can also have their colors matched to each other. Thus, the image processing of this embodiment can also be used no less effectively even in such a situation.

The image capture device according to the embodiments of the present invention generates an image signal by performing signal arithmetic operations on a photoelectrically converted signal that has been obtained by capturing an image. However, such processing of generating an image signal by performing signal arithmetic operations may also be carried out by another device that is provided independently of that image capture device. For example, even if a signal that has been obtained by an image capture device including the image capturing section 100 of this embodiment is loaded into another device (image processor) to get a program defining the image signal processing section's (7) signal arithmetic processing described above executed by a computer in that another device, the effects of the embodiments described above can also be achieved.

INDUSTRIAL APPLICABILITY

A 3D image capture device according to an embodiment of the present invention can be used effectively in any camera that ever uses a solid-state image sensor. Examples of those cameras include consumer electronic cameras such as digital still cameras and digital camcorders and solid-state surveillance cameras for industrial use. Also, an image processor according to the present invention can match the colors of two images that have parallax and that have been obtained by an image capturing system so that the positions of in-focus parts do not shift from each other between two images. Thus, the image processor can be used to process an image signal that has been obtained by the image capturing system described above and input to a display device such a 3D TV set.

REFERENCE SIGNS LIST 1 solid-state image sensor
1a solid-state image sensor's image capturing plane
2 light-transmitting plate
2a light transmitting section
3 optical lens
3a optical element functioning as both light-transmitting plate and optical lens
4 infrared cut filter
5 signal generating and receiving section
6 sensor driving section
7 image signal generating section
8 interface section
19 lens diaphragm
20, 22, 23 light beam confining plate
20a color filter transmitting red-based light ray
20b color filter transmitting blue-based light ray
21 photosensitive film
22R, 23R R ray transmitting areas of light beam confining plate
22G, 23G G ray transmitting areas of light beam confining plate
22B, 23B B ray transmitting areas of light beam confining plate
30 memory
60 subject
71 high frequency component calculating section
72 in-focus area extracting section
73 color conversion matrix calculating section
74 color conversion processing section
100 image capturing section
110 transmitting filter
120 photosensitive cell
200 signal processing section

The invention claimed is:

1. An image processor that matches the colors of two images with parallax to each other, the two images having been captured by a device comprising a light transmitting section that has two transmitting areas with mutually different spectral transmittance characteristics; and an image sensor that is arranged to receive the light that has been transmitted through the light transmitting section and that includes two kinds of pixels with mutually different spectral transmittance characteristics, both of the two kinds of pixels configured to detect at least a part of light rays that have been transmitted through one of the two transmitting areas and at least a part of light rays that have been transmitted through the other of the two transmitting areas, the processor comprising:
    an in-focus area extracting section that extracts an in-focus area of the two images;
    a color conversion matrix calculating section that obtains a color conversion matrix between the two images by reference to information about the colors of pixels that are only included in the in-focus area of the two images; and
    a color conversion section that converts the color of one of the two images by using the color conversion matrix.

2. The image processor of claim 1, further comprising a high frequency component calculating section that calculates the high frequency components of at least one of the two images,
   wherein the in-focus area extracting section extracts the in-focus areas based on the high frequency components that have been calculated.

3. The image processor of claim 2, wherein the in-focus area extracting section extracts, as the in-focus area, the vicinity of high frequency pixels in which the quantity of the high frequency components is greater than a predetermined threshold value.

4. The image processor of claim 3, wherein the in-focus area extracting section extracts, as the in-focus area, a rectangular area comprised of n pixels×m pixels (where n and m are integers that are equal to or greater than one) including the high frequency pixels.

5. The image processor of claim 3, wherein the in-focus area extracting section extracts, as the in-focus area, a rectangular area comprised of n pixels×m pixels (where n and m are integers that are equal to or greater than one) surrounding the high frequency pixels.

6. The image processor of claim 1, wherein the color conversion matrix calculating section obtains the color conversion matrix by linear computations by the minimum square method, the M estimation method or the RANSAC method.

7. A 3D image capture device comprising:
   a light transmitting section that has two transmitting areas with mutually different spectral transmittance characteristics;
   an image sensor that is arranged to receive the light that has been transmitted through the light transmitting section and that includes two kinds of pixels with mutually different spectral transmittance characteristics, wherein both of the two kinds of pixels are configured to detect at least a part of light rays that have been transmitted through one of the two transmitting areas and at least a part of light rays that have been transmitted through the other of the two transmitting areas; and
   an image processing section that generates two images with parallax based on pixel signals supplied from the image sensor, and
   wherein the image processing section includes:
   an in-focus area extracting section that extracts an in-focus area of the two images;
   a color conversion matrix calculating section that obtains a color conversion matrix between the two images by reference to information about the colors of pixels that are only included in the in-focus area of the two images; and
   a color conversion section that converts the color of one of the two images by using the color conversion matrix.

8. An image processing method for matching the colors of two images with parallax to each other, the two images having been captured by a device comprising a light transmitting section that has two transmitting areas with mutually different spectral transmittance characteristics; and an image sensor that is arranged to receive the light that has been transmitted through the light transmitting section and that includes two kinds of pixels with mutually different spectral transmittance characteristics, both of the two kinds of pixels configured to detect at least a part of light rays that have been transmitted through one of the two transmitting areas and at least a part of light rays that have been transmitted through the other of the two transmitting areas, the method comprising the steps of:
   extracting an in-focus area of the two images;
   obtaining a color conversion matrix between the two images by reference to information about the colors of pixels that are only included in the in-focus area of the two images; and
   converting the color of one of the two images by using the color conversion matrix.

9. An image processing program stored on a non-transitory computer readable medium for matching the colors of two images with parallax to each other, the two images having been captured by a device comprising a light transmitting section that has two transmitting areas with mutually different spectral transmittance characteristics; and an image sensor that is arranged to receive the light that has been transmitted through the light transmitting section and that includes two kinds of pixels with mutually different spectral transmittance characteristics, both of the two kinds of pixels configured to detect at least a part of light rays that have been transmitted through one of the two transmitting areas and at least a part of light rays that have been transmitted through the other of the two transmitting areas, the program, when executed by a processor of a computer, causes the computer to perform the steps of:
   extracting an in-focus area of the two images;
   obtaining a color conversion matrix between the two images by reference to information about the colors of pixels that are only included in the in-focus area of the two images; and
   converting the color of one of the two images by using the color conversion matrix.

* * * * *